June 10, 1930.  W. J. MILLER  1,762,236
POTTERY FORMING MACHINE
Filed Feb. 17, 1927  3 Sheets-Sheet 1

INVENTOR.
William J. Miller
BY Israel Benjamins,
ATTORNEY.

June 10, 1930.   W. J. MILLER   1,762,236
POTTERY FORMING MACHINE
Filed Feb. 17, 1927   3 Sheets-Sheet 2

INVENTOR.
William J. Miller
BY J. Benjamins,
ATTORNEY.

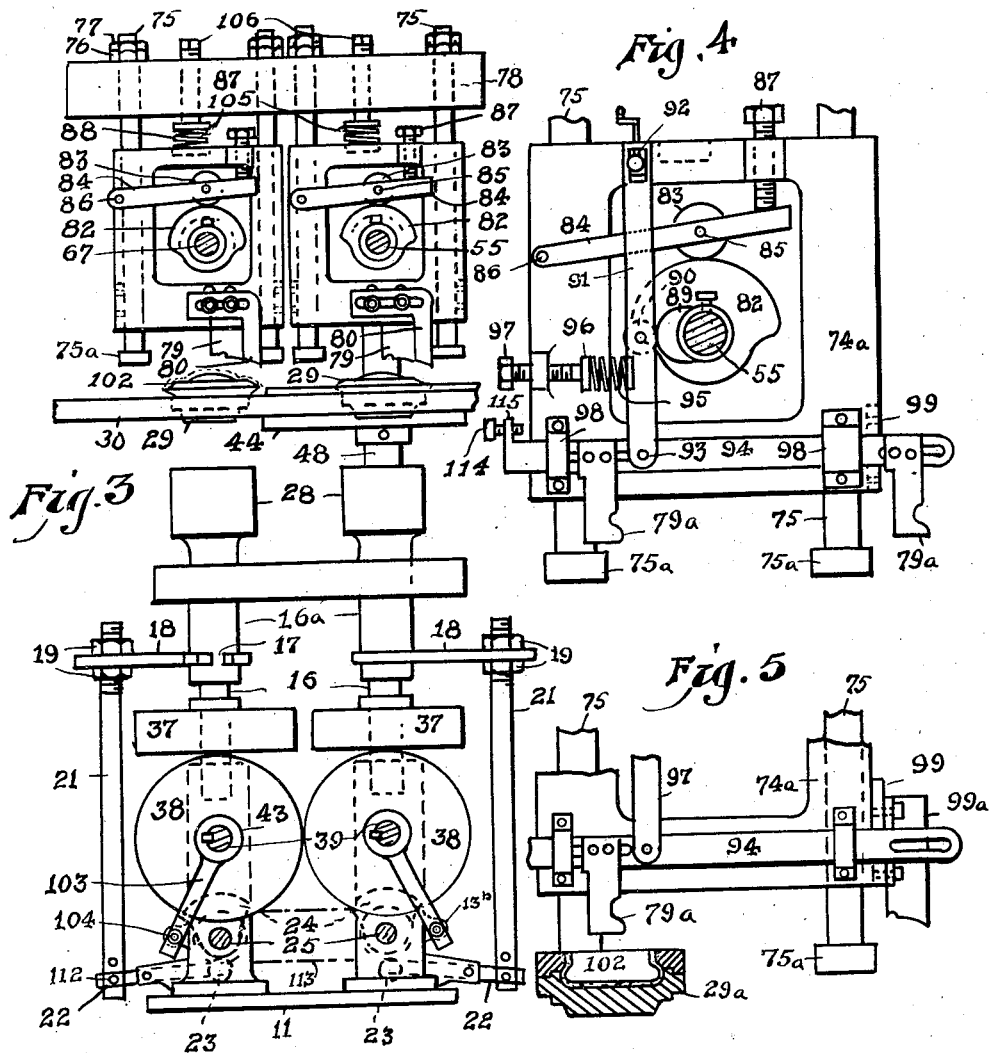

Patented June 10, 1930

1,762,236

UNITED STATES PATENT OFFICE

WILLIAM J. MILLER, OF SWISSVALE, PENNSYLVANIA

POTTERY-FORMING MACHINE

Application filed February 17, 1927. Serial No. 168,994.

My invention relates to improvements in the manufacture of articles from plastic materials, more particularly in the art of making pottery, and it consists in the novel features, which are hereinafter more fully described.

One of the objects of my invention is—to produce a perfected automatic jigger and profile, in which the profile is operated from an overhead shaft or spindle, thereby eliminating sundry parts and simplifying the construction of the machine.

Another object of my improvement is—to provide in conjunction with the structure just specified a means for periodically gradually retarding a turntable, which is employed for carrying molds, to bring it from a state of maximum rotary speed to a state of rest, in carrying molds with material thereon into operative position under one or more profiles, then to lock said turntable in position under said profiles until the operation of profiling is completed, and then gradually accelerating said turntable again, to bring it from a state of rest to a state of maximum velocity again, in removing or carrying away the molds from under said profiles.

Another object of my improvement is—to provide a means for automatically moving the shaping tools of my pottery forming machine horizontally as well as vertically into operative position, where used in the manufacture of undercut ware.

Another object of my improvement is—to provide a means for automatically feeding material to a number of molds at the same time and performing the same preliminary to having it finally shaped by multiple profiles.

A further object of my improvement is—to provide delicate adjustments for the sundry motions of the various parts of my machine, to apply to ware of different sizes and shapes.

A still further object of my improvement is—to provide a mechanism for simultaneously shaping material on a number of molds, thereby increasing production and reducing expense of attendance.

Other objects and advantages will hereinafter appear.

I attain these objects by the mechanism, which is illustrated in the accompanying drawings, or by any mechanical equivalent or obvious modification of the same.

Figure 1:
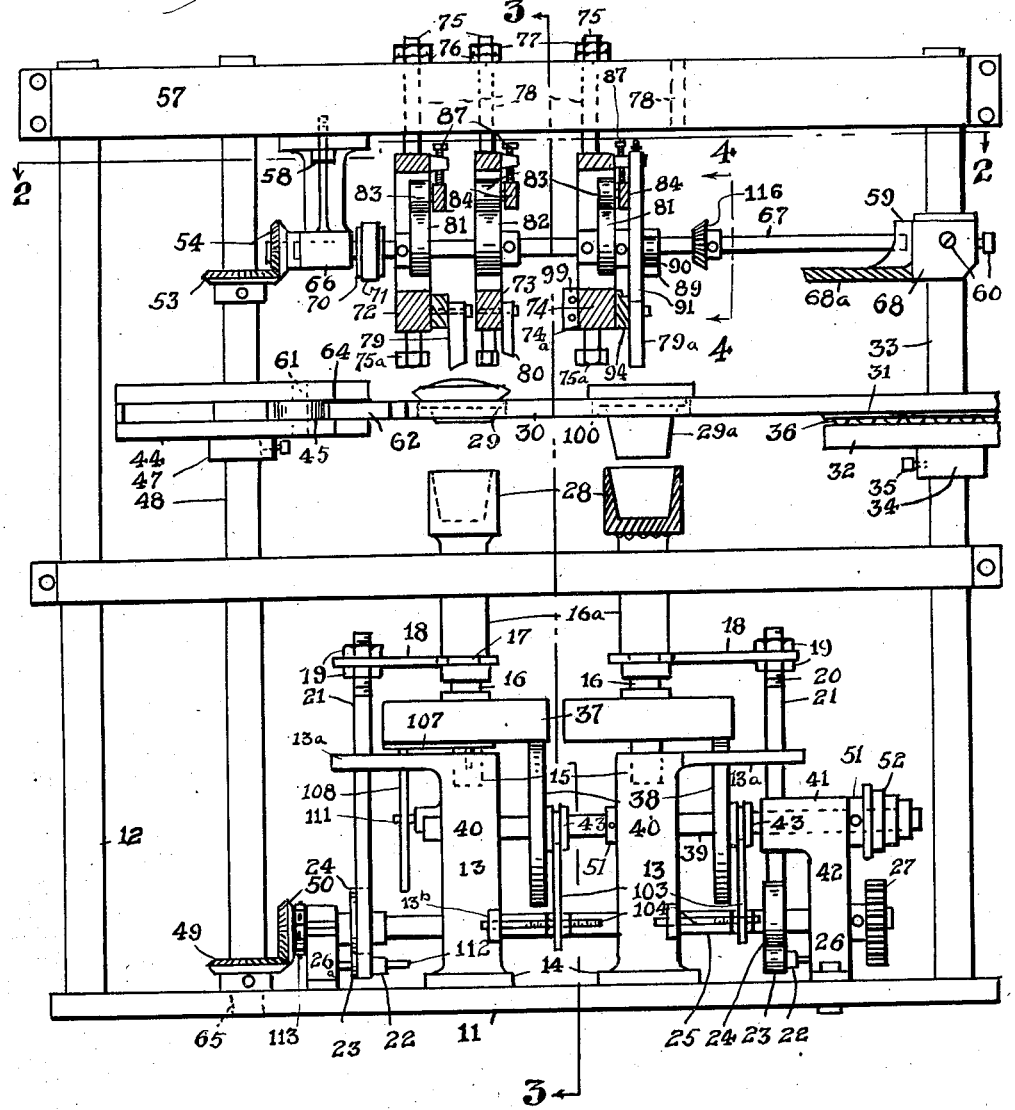
Figure 2:
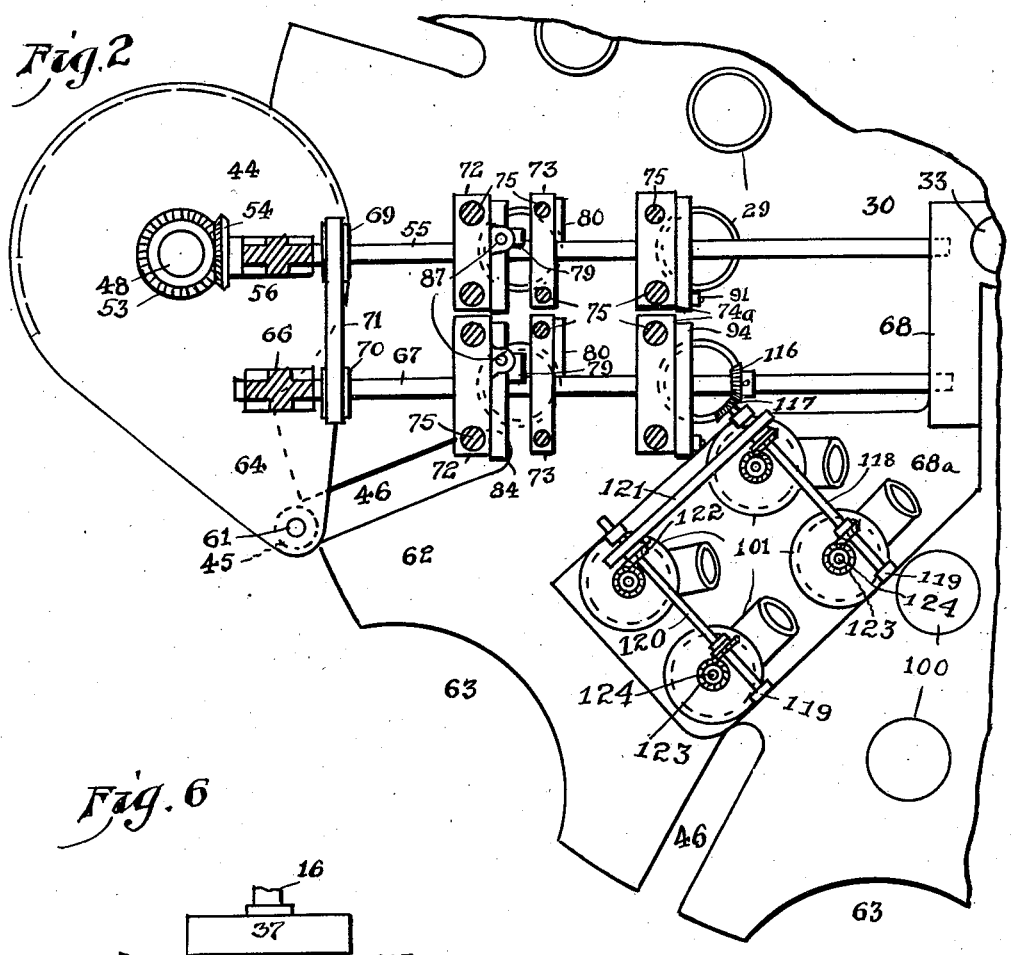

In the drawings Fig. 1 is a fragmentary front elevation of my machine, showing some parts in cross-section; Fig. 2 is a fragmentary plan view of the same, on a somewhat larger scale, on the line 2—2 of Fig. 1.

Fig. 3 is an end view on the line 3—3 of Fig. 1; Fig. 4 is a detail on a larger scale of a modification of a part of my machine, which is shown in Fig. 1, on the line 4—4 of Fig. 1; Fig. 5 is another modification of the same detail.

Figure 6:
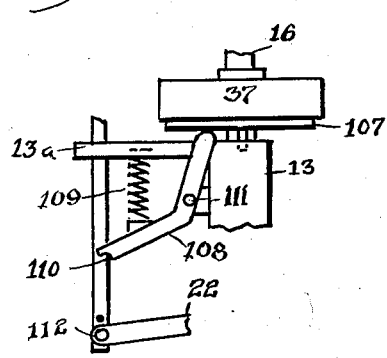

Fig. 6 is a detail in elevation of a brake operating device for the horizontal friction gears of jigger spindles, which are hereinafter described.

Like numerals refer to like parts throughout the several views;

11 designates the base of my machine, and 12 the frame, which is mounted on and secured to said base 11.

Jigger supports 13 are adjustably secured to said base 11 by means of flanges 14 at their lower ends, and they have formed integrally therewith pivot bearings 15, for the lower ends of vertical spindles 16, which telescope into and are in spline sliding engagement with jigger spindles 16ª, which are shown in Figs. 1 and 3 as having thereon necks 17, for the forked ends of yokes 18 to be connected thereto.

The yokes 18 are adjustably connected to pitmen 21 by means of nuts 19 and threads 20 on said pitmen 21, which are pivotally connected to levers 22 at one end of the latter and slidably connected to extensions 13ª of said jigger supports 13; rolls 23 are pivotally connected to the other ends of said levers 22, and are in contact with cams 24, which are adjustably secured to shafts 25, which are shown in Fig. 1 as revolvably supported by bearings 26 and 26ª.

The shafts 25 are operatively connected to each other by means of suitable sprockets or pulleys, preferably the former, and a flexible member 113, which may be either a chain or a belt, preferably the former, and they may be back-geared from a suitable motor by means of gearing 27, to impart by means of said cams, rolls, levers and pitmen a reciprocation motion to said jigger spindles 16ª, which terminate at their upper ends in chucks 28, intermittently to support molds 29, which are normally carried by a turntable 30, which has therein groups of openings 100 for said molds 29. Said openings in each group are shown in Fig. 2 as arranged in multiple series, which are disposed in substantially radial and secant lines or directions with relation to said turntable.

The series of openings 100, which is disposed in a secant line in each group of openings on said turntable 30, is shown in Fig. 2 as parallel to the series in the same group, which is disposed in a radial line; but the two series may be otherwise than parallel to each other, if desired, and the radially disposed series of openings 100 may also be disposed otherwise than in radial lines, if desired.

The term "secant line" is herein used in the geometrical sense of being a line, which is otherwise than radial or tangential with relation to said turntable 30.

Said turntable 30 is shown in Fig. 1 as revolvably supported by a roller bearing 31—32, which is adjustably secured to a centrally positioned post 33; said bearing comprises an upper disc 31, which may be made in one with said turntable 30, and a lower disc 32, which is adjustably secured to said post 33 by means of a hub 34 on said disc 32 and a set screw 35; the discs 31 and 32 form therebetween a raceway for balls 36 to roll therein.

Rotation is imparted to said spindles 16 by means of horizontally disposed friction gears 37, which are secured thereto and are in contact with adjustably positioned vertical friction gears 38 thereunder, which are in spline sliding engagement with high-speed shafts 39, which are revolvably mounted in bearings 40, which are formed on said jigger supports 13, and pillow blocks 41, which are formed at the upper ends of extensions 42 of said bearings 26.

Collars 51 are secured to said shafts 39 by means of suitable set screws, to prevent longitudinal displacement of said shafts 39; a stepped pulley 52 is also secured to the end of each of said shafts 39, for a belt, whereby it may be operatively connected to a motor or other source of power; the pulleys 52 serve for varying and adjusting the speed of said shafts 39.

The said gears 38 have thereon sleeves 43, which may be made integral therewith, if desired, and they may be shifted on said shafts 39 by means of forked yokes 103, which may be swivelled on said sleeves 43, and screws 104, which may be adjustably connected to said yokes 103 and secured to a boss 13ᵇ on each of said jigger supports 13, thereby varying and adjusting the velocity of said spindles 16 and chucks 28, as described in my co-pending application for patent for "Mechanism for producing intermittent rotation of a jigger spindle," Serial 166,180, filed February 5, 1927, which has become Patent #1,655,431, January 10th, 1928.

Each of the gears 37 may be intermittently retarded and brought to a state of rest by means of a brake 107, which is actuated by the upper end of the vertical arm of a bell crank lever 108, pivoted at 111, which has its horizontal arm under the pressure of the lower end of a spring 109, which is shown in Fig. 6 as abutting at its upper end against the underside of the extension 13ª of said jigger support 13.

A hook 110 is provided in the end of said horizontal arm, for being intercepted by a pin 112 in said pitman 21, thereby releasing said brake 107, as described in my last mentioned co-pending application.

The turntable 30 has an intermittent angular motion imparted thereto by means of a so-called "Geneva drive," which contains a rotary member 44, which has thereon an arm 64; said member 44, together with the arm 64, is called "the rotator"; the arm 64 has a roll 45 pivotally connected thereto by means of a pin 61, as shown in Figs. 1 and 2; the roll 45 is in intermittent engagement with the sides of radial slots 46, which are formed in a horizontal peripheral plate 62, which is called a "geneva," and which may be bolted to said table 30, or made integral therewith, if desired.

The plate 62 is also shown in Fig. 2 as having in the periphery thereof concave part-circular cut-outs or indentations 63, to fit and mesh with the circular part of the main body of said member 44, during the intervals of time when the roll 45 on the arm 64 of the latter is out of engagement with the sides of the slots 46 of said plate 62, whereby the latter with the table 30 is kept stationary.

The member 44 and arm 64 are preferably hollow and open on the sides of said arm 64, to permit the parts of the periphery of said plate 62, which are adjacent to said slots 46, to pass therethrough during the interval of time when said plate 62 is rotated by said roll 45, as is hereinbefore described.

The member 44 has thereon a hub 47, whereby it may be adjustably secured to a vertical shaft 48 by means of a suitable set screw, as shown in Fig. 1.

The shaft 48 is pivoted at the lower end thereof at 65 in said base 11, and it is shown as having secured thereto near the lower end thereof a bevel gear 49, which is in mesh with another bevel gear 50 on said shaft 25, whereby said member 44 is rotated, thereby turning said turntable 30 in synchromism with the reciprocation of said jigger spindles 16 and the chucks 28 thereon.

The vertical shaft 48 has also secured thereto near the upper end thereof a horizontal bevel gear 53, which is in mesh with a vertical bevel gear 54, which is secured to one end of a spindle 55, which is revolvably supported at said end thereof by means of a bearing 56, which is shown in Fig. 2 and is secured to an overhead bridge 57 by means of screws 58, and at the other end thereof by means of a bearing 59, which is secured to said post 33 by means of screws 60.

Another bearing 66, which is also secured to said bridge 57, is employed to revolvably support one end of another spindle 67, which is parallel to said spindle 55; the other end of said spindle 67 is journalled in a block 68, which forms an extension of said bearing 59.

A pair of pulleys or sprockets 69 and 70, preferably sprockets, are secured to said spindles 55 and 67 respectively, to be engaged by a belt or chain 71, preferably the latter, which serves to transmit motion from said spindle 55 to said spindle 67, as shown in Fig. 2.

Pairs of reciprocable supplemental frame units or supports 72, 73 and 74 for profiles and trimmers, are slidably mounted on vertical suspension members 75, to reciprocate thereon, as is hereinafter more fully described.

Said members 75 are suspended from said bridge 57, and are adjustably secured in position thereon by means of nuts 76 and lock nuts 77, which are shown as connected to the upper ends of said members 75, which pass through sockets 78 in said bridge 57.

Heads or stops 75ª are provided on the lower ends of said members 75, to limit the lowest possible position thereon of said supports 72, 73 and 74, which are preferably hollow and are arranged to enclose said spindles 55 and 67, as shown in Figs. 3 and 4.

By varying and adjusting the position of said members 75 with relation to said bridge 57 the lowest possible position of said supports 72, 73 and 74 is thereby also varied and adjusted.

Profiles 79 are adjustably connected to said supports 72 and 74, and trimmers 80 are adjustably secured to said supports 73 by means of suitable bolts or screws, as shown in the drawings, to shape and trim the material on said molds 29, when the latter are raised from the turntable 30, and brought into operative position under said profiles and trimmers by said reciprocating chucks 28, which have rotation imparted thereto by said gears 37 and 38, as hereinbefore described.

Cams 81 and 82 are adjustably secured to said spindles 55 and 67 in contact with rolls 83, which are pivotally connected to levers 84 by means of pins 85, as shown in Fig. 3.

The levers 84 are pivotally connected at one end thereof to one side of said supports 72, 73 and 74 by means of pins 86, and are abutting at the other end thereof against the underside of screws 87, which are adjustably positioned in the tops of said supports 72, 73 and 74. These screws 87 may be adjusted while in operation and while the driving connection subsists.

By lowering the position of said screws 87 with relation to the tops of said supports 72, 73 and 74, the latter are thereby caused to be raised by said cams 81 and 82 to a higher elevation with relation to said members 75 for any position of said cams 81 and 82, and vice versa, thereby varying and adjusting while in operation and while the driving connection subsists, what may be called "the altitude of reciprocation" of said supports 72, 73 and 74, or the highest position of said supports with relation to said molds, without changing the length of the stroke of said supports, where the said stroke is not modified by the influence of said members 75, which are hereinbefore described, and which limit the lowest possible position of said supports 72, 73 and 74.

By keeping said members 75 stationary and lowering said screws 87, a point will be reached when the supports 72, 73 and 74 will reciprocate without contacting with the heads or stops 75ª. The lowest position of reciprocation of the said supports may then be adjusted while in operation by adjusting said screws 87.

The highest position of said supports 72, 73 and 74 will always be affected by the manipulation of said screws 87, as hereinbefore described.

Springs 88 are interposed between the tops of said supports 72, 73 and 74 and the underside of plates 105, which are shown as situated at the lower ends of adjusting screws 106 in said bridge 57, to resiliently press on and move said profiles and trimmers vertically downwardly into operative position, to shape and trim material on said molds 29, when said profiles and trimmers are allowed to descend during part of the revolution of said cams 81 and 82, thereupon to be raised by the action of said cams 81 and 82 on said supports 72, 73 and 74 during another part of the revolution of said cams, in opposition to the pressure of said springs 88.

The springs 88 are initially strained by said screws 106 and are further compressed during the upward motion of said supports, and they are partly extended during the downward motion of the same.

The initial pressure of said springs 88 on said supports 72, 73 and 74 may be regulated by varying and adjusting the position of said screws 106 in said bridge 57; both the initial and final pressure of said springs 88 may be changed by changing the position of said screws 87 on said supports 72, 73 and 74.

The position of said screws 87 is first to be adjusted to suit the required thickness of the ware and the position of the molds 29, whereupon the required pressure of said springs 88 may be adjusted by said screws 106.

In the modification, shown in Fig. 4, one of said spindles 55 or 67 has adjustably secured thereto inside of a profile support 74ª, by means of a suitable set screw, a cam 89, which is in contact with a roll 90, which is pivotally connected to an oscillating arm 91; the latter is pivotally connected at one end thereof to a floating pivot block or bearing 92, and at the other end thereof by means of a pin 93 to a horizontal sliding bar 94, which is slidably connected to said support 74ª by means of guides or sockets 98; said bar 94 has adjustably secured thereto profiles 79ª, for use with undercut ware, in which the neck is narrower than the body of the ware, which is usually concave inside, as shown in Fig. 5.

The floating pivot block or bearing 92 may be similar to the floating block, which is described in my co-pending application for patent for Multiple and automatic jiggers, Serial No. 148,872, filed November 17, 1926, except that the said floating pivot bearing 92 is situated at the end of the arm 91, instead of in the intermediate part thereof, as in my above co-pending application, and it serves the same purpose, to wit: to vary and adjust while in operation and while the driving connection subsists the angle of oscillation of said lever 91, thereby varying and adjusting the stroke of said bar 94 with the profiles 79ª thereon.

A compression spring 95 is abutting at one end thereof against a plate 96, which is carried by a screw 97, which is adjustably secured to said support 74ª, and at the other end thereof against said lever 91, thereby co-operating with said cam 89 in oscillating said lever 91, and it also provides a resilient application of and contact with the profiles 79ª, which are shown as adjustably secured to said bar 94, and the material 102 in undercut ware molds 29ª which are shown in Fig. 5.

A screw 114 is shown in Fig. 4 as adjustably engaged in a spur 115 at one end of said sliding bar 94, to be intercepted by said support 74ª, thereby adjustably limiting the travel of said bar 94 with said profiles 79ª thereon on said support 74ª.

All the other parts connected to said support 74ª may be substantially the same as those employed in connection with said supports 72 and 74.

The support 74ª may also be provided with a lug or flange 99, for adjustably securing thereto a profile-holding bracket 99ª, see Fig. 5, for connecting thereto a profile 79, such as hereinbefore described, for use with ware, which is not undercut.

The lug or flange 99 extends to the left of said support 74ª and 74, when the latter is in position in Fig. 1.

The support 72, 73 and 74 may also be provided with brackets substantially similar to the brackets 99ª, illustrated in Fig. 5 which may be situated in adjacent front and rear supports as shown in Fig. 3, and serve to secure said front and rear supports to each other, when it is desired to actuate both supports by one and the same cam 82.

In the modification shown in Fig. 5 the sliding bar 94 has connected thereto only one undercut ware profile 79ª, and said bracket 99ª has secured thereto a non-undercut ware profile 79, whereby the support 74ª may be employed simultaneously to act on two molds, having different kinds of ware thereon.

The bearing block 68, one form of which is shown in plan view in Fig. 2, has thereon an extension 68ª in the form of a platform, which extends over some of the openings 100 in said turntable 30; molds 29 are supported in said openings 100, and combined feeders and preformers 101 are adjustably secured in position on said platform 68, to feed a charge of material 102 on to said molds 29, and preform it, preliminary to having said material 102 finally shaped by said profiles 79 and 79ª.

Said combined feeders and preformers 101 may be such as are described in my co-pending application for patent for Method and means for feeding plastic material to molds, Serial No. 166,179 filed February 5, 1927.

Said combined feeders and preformers 101 are shown in Fig. 2 as operatively connected to said spindle 67 by means of a bevel gear 116, which is adjustably secured to the latter, in mesh with a bevel gear 117, which is secured to one end of a horizontal spindle 118, which is revolvably supported in position over the inner end of said platform 68ª by means of bearings or pillow-blocks 119.

Another spindle 120 is revolvably supported in position over the outer end of said platform 68ª by means of bearings 119, and is operatively connected to said spindle 118 by means of a flexible member 121, which may be either a belt or a chain, preferably the latter, and is carried by suitable pulleys or sprockets, preferably the latter.

Vertically disposed skew bevel or spiral gears 122 on said spindles 118 and 120 are in mesh with horizontally disposed skew bevel or spiral gears 123, which are secured to the upper ends of vertical spindles 124 on said combined feeders and preformers 101, thereby transmitting motion to the latter.

Many changes may be made in the details of my machine without departing from the main scope of my invention, and parts of my invention may be used without other parts.

I do not therefore, restrict myself to the details as shown in the drawings; but I intend to include also all mechanical equivalents and obvious modifications of the same within the scope of my invention.

I claim as my invention and desire to secure by Letters Patent:

1. In a pottery forming machine a carrier for supporting molds with material thereon, one or more jiggers, situated thereunder, a means for actuating the same, one or more vertically slidable supports for profiles, a horizontally slidable member on each of said supports, one or more profiles, secured to said members, one or more revolvable spindles, one or more cams on said spindles for moving said supports with said members and said profiles thereon vertically into operative position in molds of undercut ware, a means, for sliding said members with said profiles thereon horizontally into operative position in molds of undercut ware, and a means for returning said members with the profiles thereon to their original position.

2. In a pottery forming machine a carrier for supporting molds with material thereon, one or more jiggers, situated thereunder, a means for actuating the same, one or more vertically slidable supports for profiles, a horizontally slidable member on each of said supports, one or more profiles, secured to said members, one or more revolvable spindles, one or more cams on said spindles, for moving said supports with said members and profiles thereon vertically into operative position in molds of undercut ware, one or more levers, pivotally and slidably connected to said supports and to said members, springs, interacting between said supports and said levers, to turn the same in a direction to slide said members with said profiles thereon horizontally into operative position in the molds of undercut ware, and other cams on said spindles, to turn said levers in the opposite direction, against the force of said springs, to return said members with said profiles thereon to their original positions.

3. In a pottery forming machine a carrier, for supporting molds with material thereon, one or more jiggers, situated thereunder, a means for actuating the same, one or more vertically slidable supports for profiles, a horizontally slidable member on each of said supports, one or more profiles secured to said members, one or more revolvable spindles, one or more cams on said spindles, for moving said supports with said members and profiles thereon vertically into operative position in molds of undercut ware, one or more levers pivotally and slidably connected to said supports and said members, springs interacting between said supports and said levers, to turn the same in a direction to slide said members with said profiles thereon horizontally into operative position in molds of undercut ware, other cams on said spindles, to turn said levers in the opposite direction, against the force of said springs, to return said members with said profiles thereon to their original position, and a means for adjusting the resilience of said springs.

4. In a pottery forming machine a carrier, for supporting molds with material thereon, one or more jiggers, situated thereunder, a means for actuating the same, one or more vertically slidable supports for profiles, a horizontally slidable member on each of said supports, one or more profiles secured to said members, one or more revolvable spindles, one or more cams on said spindles, for moving said supports with said members and profiles thereon vertically into operative position in molds of undercut ware, one or more levers, pivotally and slidably connected to said supports and said members, springs interacting between said supports and said levers, to turn the same in a direction to slide said members with said profiles thereon horizontally into operative position in molds of undercut ware, other cams on said spindles, to turn said levers in the opposite direction, against the force of said springs, to return said members with said profiles thereon to their original positions, and screws, engaged in said supports, for adjusting the resilience of said springs.

5. In a pottery forming machine a carrier, for supporting molds with material thereon, one or more jiggers situated thereunder, a means for actuating the same, one or more vertically slidable supports for profiles, a horizontally slidable member on each of said supports, one or more profiles secured to said member, one or more revolvable spindles, one or more cams on said spindles, for moving said supports with said members and profiles thereon vertically into operative position in molds of undercut ware, one or more levers pivotally and slidably connected to said supports and said members, compression springs interacting between said supports and said levers, to turn the same in a direction to slide said members with the profiles thereon horizontally into operative position in molds of undercut ware, other cams on said spindles, to turn said levers in the opposite direction, against the pressure of said springs, to return said members with said profiles thereon to their original positions, screws, engaged in said supports, and abutting plates on said screws, in contact with the ends of said springs, which react on said supports, for adjusting the resilience of said springs.

6. In a pottery forming machine a carrier for supporting molds with material thereon, one or more jiggers, situated thereunder, a means for actuating the same, one or more vertically slidable supports for profiles, a horizontally slidable member on each of said supports, one or more profiles, secured to said members, a means for moving said supports with said members and profiles thereon vertically into operative position, a means for sliding said member with said profiles thereon horizontally into operative position in molds of undercut ware, a means for returning said members with the profiles thereon to their original position, and lugs on said supports, for detachably connnecting thereto profiles for acting on non-undercut ware simultaneously with said first mentioned profiles.

7. In a pottery forming machine a carrier, for supporting molds with material thereon, one or more jiggers, situated thereunder, a means for actuating the same, one or more vertically slidable supports for profiles, a horizontally slidable member on each of said supports, one or more profiles, secured to said members, one or more revolvable spindles, one or more cams on said spindles, for moving said supports with said members and said profiles thereon vertically into operative position in molds of undercut ware, a means for sliding said members with said profiles thereon horizontally into operative position in molds of undercut ware, a means for returning said members with the profiles thereon to their original position, and a means for limiting the stroke of said members on said supports, when said members are slid thereon into operative position.

8. In a pottery forming machine a carrier, for supporting molds with material thereon, one or more jiggers, situated thereunder, a means for actuating the same, one or more vertically slidable supports for profiles, a horizontally slidable member on each of said supports, one or more profiles, secured to said members, one or more revolvable spindles, one or more cams on said spindles, for moving said supports with said members and said profiles thereon vertically into operative position in molds of undercut ware, a means for sliding said members with said profiles thereon horizontally into operative position in molds of undercut ware, a means for returning said members with the profiles thereon to their original position, a means for limiting the stroke of said members on said supports, when said members are slid thereon into operative position, and a means for varying and adjusting the position of said limiting means, thereby varying and adjusting the length of said stroke.

9. In a pottery forming machine a carrier, for supporting molds with the material thereon, one or more jiggers, situated thereunder, a means for actuating the same, one or more vertically slidable supports for profiles, a horizontally slidable member on each of said supports, one or more profiles, secured to said members, one or more revolvable spindles, one or more cams on said spindler, for moving said supports with said members and said profiles thereon vertically into operative position in molds of undercut ware, a means for sliding said members with said profiles thereon horizontally into operative position in molds of undercut ware, a means for returning said members with the profiles thereon to their original position, one or more spurs on said members and screws therein to be intercepted by said supports, for limiting and adjusting the stroke of said members on said supports when said members are slid thereon into operative position.

10. In a pottery forming machine a carrier, for supporting molds with material thereon, one or more jiggers, situated thereunder, a means for actuating the same, one or more vertically slidable supports for profiles, a horizontally slidable member on each of said supports, one or more profiles, secured to said member, one or more revolvable spindles, one or more cams on said spindles, for moving said supports with said members and profiles thereon vertically into operative position in molds of undercut ware, one or more levers, pivotally and slidably connected to said supports and to said members, springs, interacting between said supports and said levers, to turn the same in a direction to slide said members with said profiles thereon horizontally into operative position in the molds of undercut ware, other cams on said spindles, to turn said levers in the opposite direction, against the force of said springs, to return said members with said profiles thereon to their original positions, and a means for varying and adjusting the operating length of said levers, thereby varying and adjusting the stroke of said members with said profiles thereon.

11. In a pottery forming machine a turntable for carrying molds with material thereon, one or more feeders and preformers, positioned over some of said molds, to feed thereunto and preform a charge of material, one or more jiggers, situated under other of said molds, one or more profiles, positioned over said turntable opposite said jiggers, a means for imparting an intermittent angular motion to said turntable, said means gradually to accelerate and gradually to retard said turntable, to move said molds horizontally into position over said jiggers, to be raised by the latter into operative position under said profiles and rotated thereunder, to have said material shaped thereby, a means for reciprocating said jiggers, a means for transmitting motion from said reciprocating means to said imparting means and said profiles, a means for transmitting motion from said profiles to said feeders and preformers, thereby synchronizing the said motions with the reciprocation of said jiggers.

12. In a pottery forming machine, a main stationary frame comprising vertical suspension members, reciprocably mounted supplemental frame units slidably supported by said suspension members, shaping tools secured to said supplemental frame units, and cam means for actuating said units to thereby actuate said shaping tools.

13. In a pottery forming machine, a main stationary frame comprising vertical suspension members, reciprocably and resiliently mounted supplemental frame units supported by said suspension members, shaping tools secured to said supplemental frame units, cam means for reciprocating said units to thereby actuate said shaping tools, and means for adjusting, while in operation, the reciprocation of said units.

14. In a pottery forming machine, a main stationary frame comprising vertical suspension members, vertically reciprocable supplemental frame units mounted on said suspension members and laterally reciprocable members mounted on said suplemental units, shaping tools secured on said slide bars, and cam means for reciprocating said units and slide bars to thereby actuate said shaping tools.

15. In a pottery forming machine, a main stationary frame comprising vertical suspension members, vertically reciprocable supplemental frame units slidably mounted on said suspension members and laterally reciprocable slide bars mounted on said units, shaping tools secured on said units and slide bars, cam means for reciprocating said units and slide bars, and means for adjusting, while in operation, the reciprocation of said units and slide bars to thereby adjust the extent of movement imparted to said tools.

16. In a pottery forming machine, a main stationary frame comprising vertical suspension members, reciprocably mounted shaping-tool-supporting units slidably mounted on said suspension member, a rotatable mold carrier, a plurality of molds thereon, reciprocable and rotatable chucks, and a common drive means adapted to impart an intermittent, gradually accelerated and retarded angular motion to said carrier and reciprocate said units and said chucks and also rotate the latter, to bring said molds and said shaping tools into operative relation.

17. In a pottery forming machine, a main stationary frame comprising vertical suspension members, reciprocably mounted shaping-tool-supporting units slidably mounted on said suspension members, a rotatable mold carrier, reciprocable and rotatable chucks, a series of feeding units also supported by said main frame, and a common drive means for reciprocating said units and said chucks and rotating the latter and also for actuating said feeding units, said drive means being adapted to impart an intermittent, gradually accelerated and retarded angular motion to said mold carrier.

WILLIAM J. MILLER.